United States Patent Office 3,298,547
Patented Jan. 17, 1967

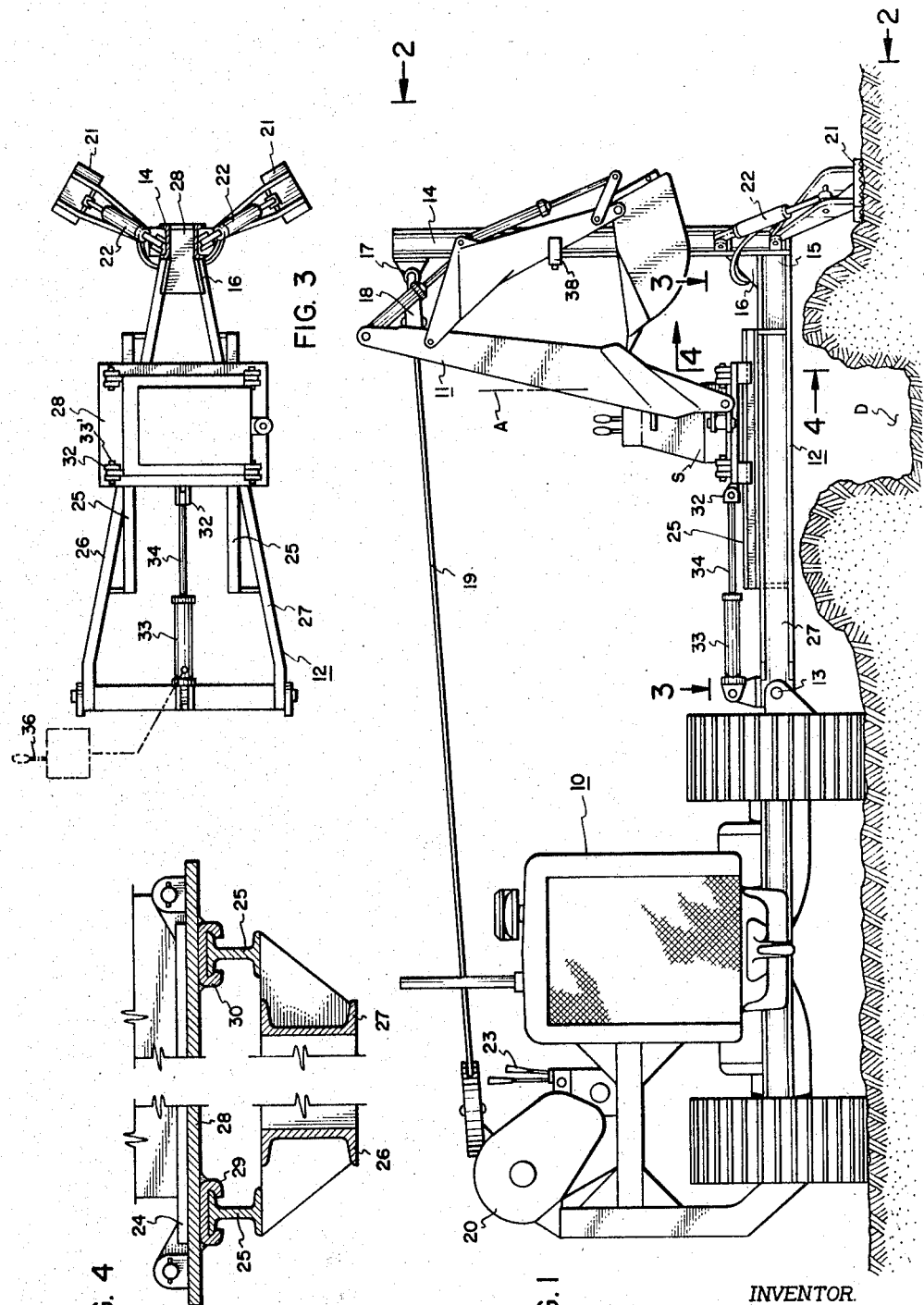

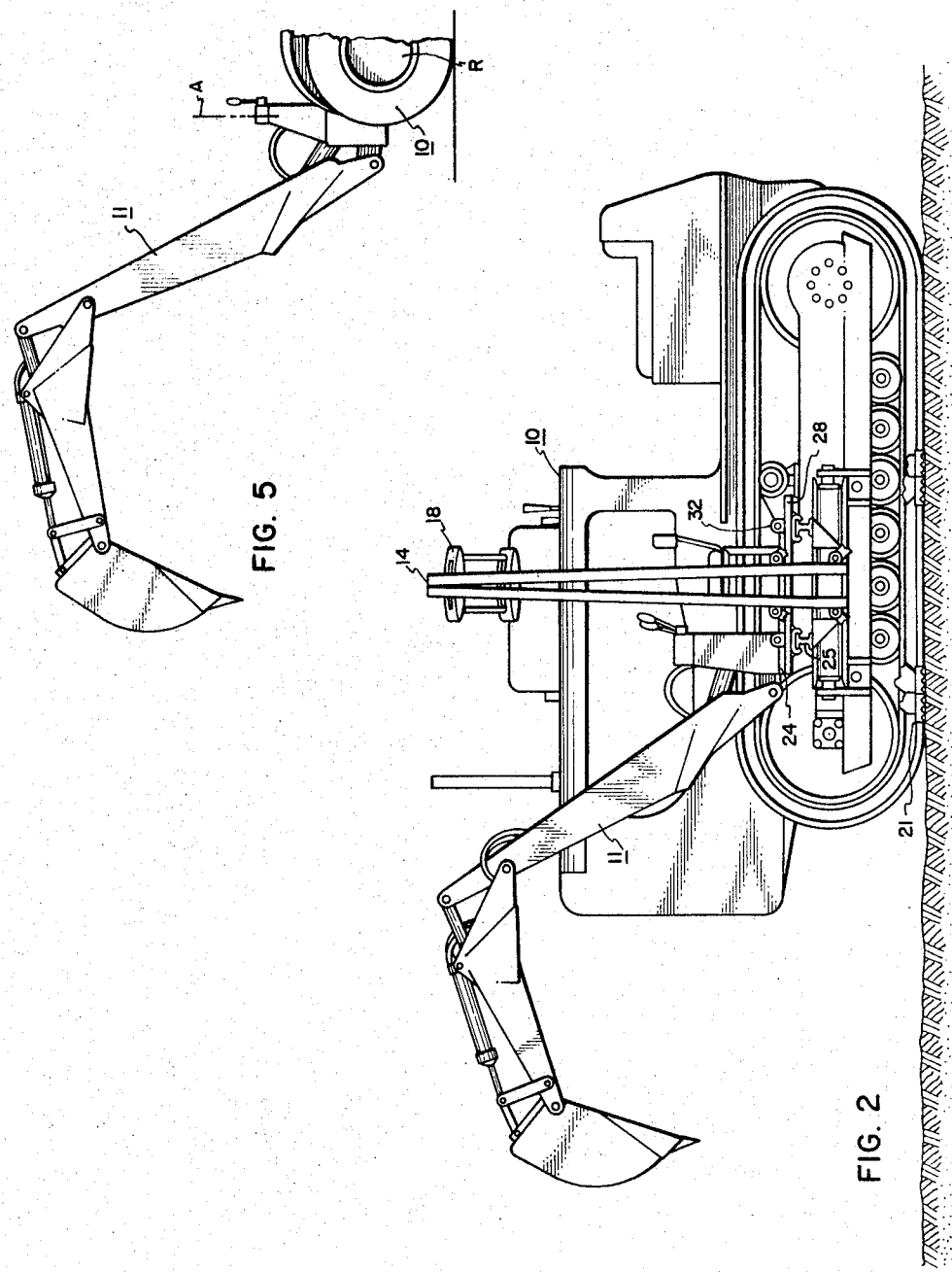

3,298,547
VERSATILE EARTH-MOVING EQUIPMENT
Edgar S. Williams, 4890 Wasatch St.,
Murray, Utah 84107
Filed July 6, 1965, Ser. No. 469,805
2 Claims. (Cl. 214—138)

The present invention relates to earth-moving equipment and, more particularly, to tractor and hoe structure wherein the hoe can be used either at the rear of the tractor in the conventional manner or the same can be repositioned onto certain boom structure of the tractor in order to be able to clean, scrape or dig along an area which is laterally spaced relative to the tractor.

In the past there have been innumerable designs of earth-moving equipment, in general, and tractors, in particular. One present type of tractor, taking the form of a bulldozer traction vehicle, includes an outwardly extensible boom for supporting pipe to be lowered into a ditch. Conventional tractors will also include hoes or backhoes, as they are designated in the industry, for digging a ditch straddled by the tractor.

In many types of terrain it is very desirable for a ditch to be dug laterally of the tractor so that the same will not have to straddle the ditch area. The inventor, hence, has conceived of the unique idea of transferring the backhoe, usually releasably affixed to the rear of a tractor, to that portion of the tractor which includes an extensible boom. When the hoe is affixed to boom, then, not only can a ditch be dug along the side of a tractor so that the latter does not have to straddle the ditch, but also undulating terrain such as hills and other steep upgrades can be accommodated for laying pipe or for other purposes for which the ditch is being dug. Thus, the tractor now will not have to go all the way up the incline, and turn around to lower the backhoe to the rear of the tractor in order to dig the ditch. Rather, the tractor can be driven forwardly up the incline and a hoe, now facing forwardly, lowered into the earth and the tractor reversed back down the incline which the ditch is being dug. Further, it is to be noted that the scraping or cleaning operation of the ditch will be greatly facilitated and all of the earth urged down the incline along the ditch so that the upper part of the ditch is always clean as the cleaning operation proceeds downhill.

Accordingly, a principal object of the present invention is to provide new and useful earth-moving equipment in which the traction vehicle thereof is provided with boom means enabling the lateral positioning, with respect to the tractor, of a forwardly-facing hoe.

A further object of the present invention is to provide earth-moving equipment wherein pneumatically or hydraulically operated hoe structure can be incorporated in the equipment either at the rear of the vehicle or at a side area thereof.

An additional object of the invention is to provide for a tractor having a boom, a forwardly-facing hoe structure releasably securable over the boom, and this such that the hoe may be translated back and forth in a transverse direction to accommodate selective spacing of the hoe relative to the tractor vehicle along a given side of the latter.

An additional object is to provide a forwardly-facing hoe for a tractor, the same being mounted on boom structure and being clampable thereto such that the entire boom or hoe structure can be elevated upwardly and over the tractor vehicle when desired.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a front view of a tractor and hoe incorporating the principles of the present invention, this to enable the earth-moving equipment shown to dig a ditch in an area laterally of and parallel to the direction of travel of the tractor.

FIGURE 2 is a side elevation of the structure of FIGURE 1, looking from right to left (with cylinders omitted for clarity) wherein the hoe is in its extended position and ready to dig the ditch shown in FIGURE 1.

FIGURE 3 is a fragmentary top plan taken along the line 3—3 in FIGURE 1, showing the platform and track structure of the boom, with the hoe structure removed for purposes of clarity.

FIGURE 4 is a vertical section enlarged view and taken along the line 4—4 in FIGURE 1.

FIGURE 5 is a fragmentary view of the rear of the tractor of FIGURE 2, taken along its opposite side, and indicating the general manner in which a backhoe is releasably secured to the tractor in the conventional manner.

Throughout the specification the term "tractor" as used herein denotes not only the traction vehicles used on farms as tractors, but also large construction traction machines such as those going under the trade name "caterpillars," "bulldozers" and like equipment is also included within the purview of the invention.

FIGURE 5 illustrates the rear portion R of a tractor 10, the same being provided with the detachable, mechanically-operated "backhoe" or hoe 11. For sake of convenience the term "hoe" shall be used for equipment known as holes and backhoes in the construction industry. Such hoes are conventionally used, are provided by a number of manufacturers such as the earth-moving equipment division of the Ford Motor Company. The operation of hoes or backhoes, as they are known in the industry, and the physical construction thereof, are well known in the art. Such backhoes may be, mechanically, hydraulically, or pneumatically operated, either by the driver of the traction vehicle or by an independent person. Such equipment is used for digging ditches and scooping out dirt therefrom. They are generally pivotal on a fifth wheel, or employ other type of pivoting principle, and can be used for scooping up dirt and transporting the same to the side of the ditch. Backhoe 11 in FIGURE 5 is strictly conventional and, in the usual manner, is releasably secured to the back of tractor R. In the conventional manner, also, the same may be easily removed from the tractor and blocked, when desired. All of this is conventional in the art.

The present invention illustrates that the hoe 11 may, if desired, be repositioned so as to face forwardly. This is illustrated in FIGURES 1 and 2. This is deemed novel in the art in that the hoe cannot only face forwardly, to accommodate tractors going uphill and working down the incline of a slope, but also the hoe may be laterally displaced relative to the longitudinal axis of the vehicle so that the tractor need not straddle the ditch being dug. Furthermore, as will be seen in the present invention, the hoe can be selectively positioned along the horizontal, extension boom means of the tractor in order to accommodate slight positioning adjustments in performing digging and scraping functions.

In FIGURES 1 and 2 the tractor 10 includes extension boom means 12 which is pivoted at 13 to the tractor 10 proper. Upright boom 14 is preferably fixedly secured to extension boom means 12 at the latter's extremity 15, and is rigidly secured thereto by means of welded gusset means 16. Portion 17 of upright boom 14 is provided with pulley means 18 which accommodates hoist cable 19. The latter may be either permanently affixed at portion 17 or may include a number of convolutions to increase the mechanical advantage of power hoist 20. Power hoist 20 is provided the equipment in the conventional manner. Certain, conventional counterweight means may be provided the tractor to balance the boom structure in its descent, if desired. The inclusion of pivotable, extendable boom means, a power hoist, and hoist cable means for raising and lowering the boom means is strictly conventional in the art and is used for laying large conduits such as gas lines in the field. Counterweight structure and the power hoist structure 20 is all well established in the art. Likewise well established in the art is the inclusion of foot means 21 provided with actuating cylinders 22 of a pneumatic or hydraulic type which are actuated, together with remaining hoist drive and digging structure, by lever system 23.

Again, the present invention comprehends the repositioning of hoe 11 relative to tractor 10 from its normal rearward position to a position on the extension boom means 12. This may be accommodated for by the inclusion of a pair of horizontal rails or tracks 25 which may be welded or otherwise secured to extension boom means 12. The latter may comprise a pair of horizontal booms 26 and 27 which converge toward their outermost extremity 28 and which attach to the upright boom or boom structure 14. The latter may be of one, two, or more elongate pieces construction. The tracks 25 may comprise I-beams or any other type of slide rail or other suitable construction. There may be a metal-to-metal contact provided or, if desired, a roller carriage can be supplied each of the tracks 25. In the present invention there may be included, in a preferred embodiment thereof, a platform 28 having track guards 29 and 30 welded or otherwise secured thereto. These track guards 29 and 30 are of doubled-back configuration, see FIGURE 4, relative to the respective cross-sections and lap over the I-beam tracks as indicated. Other types of slidable or rolling friction structures may be included in order that the platform may be movable back and forth along the tracks 25. Platform 28 may include upstanding ears 32 or other means for pinning as by pin means 33' the bottom structure 34 of hoe 11 to the platform. The structure is used for providing the mounting of the hoe to the tractor likewise to be used in duplicate so that the hoe can also be attached to platform 28. See FIGURES 2 and 3 in the above regard.

In order to adjust the lateral position of the hoe relative to the tractor there may be included a platform translation cylinder 33 having a piston rod 34 pivotably attached by means 35 to platform 28. By a conventional, pneumatically or hydraulically operating handle or other control means 36, the cylinder 33 can be actuated to move platform 28 back and forth along tracks 25. This in turn will adjust the lateral position of the hoe relative to the tractor in order that the same may be aligned with ditch D in FIGURE 1.

As before mentioned, the hoe 11 is strictly conventional in design, is currently manufactured by several manufacturers, and conventionally includes structure S by which the hoe may be pivoted about vertical axis A in either direction. This same feature is incorporated in the replacement of the hoe on tractors indicated in FIGURE 1 so that the hoe may be pivoted about its own axis A in the conventional manner. When such is done within the context of the present invention, then clamp means 38 may be provided to clamp the backhoe structure to upright boom 14. When such is accomplished then the power winch 20 can be actuated in the conventional manner so as to pivot in a counter-clockwise direction the entire boom structure toward and above the tractor 10. In this position the tractor and structure can be moved from place to place and from one work area to another.

In operation, the tractor of the present invention may either straddle an area in which a ditch is to be dug, as in the case where the backhoe 11 is affixed to the rear of the traction vehicle as shown in FIGURE 5, or the hoe may be transferred to its position on extension boom means 12 in order that the hoe may face forwardly as shown in FIGURES 1 and 2. The latter will be desirable where a tractor proceeds forwardly up a steep incline and then is used to dig a ditch alongside the tractor and downhill as the tractor is backing up. This can easily be accomplished with the backhoe and tractor arranged in the manner shown. Further, all dirt falling into the ditch can be easily scraped out of the ditch, i.e. down the incline, which is preferred over the present practice of going uphill and using a backhoe at the rear of the tractor.

Either the operator himself may actuate the backhoe with the same hydraulic system or pneumatic system used in the case of the conventional placing of the backhoe shown in FIGURE 5, or an independent operator at independent identical controls supplied as is the case seen in FIGURE 2. The type of hydraulic or pneumatic system used with the backhoe is a matter of choice and is strictly conventional and common in the art as applies to backhoes in general.

Once the operator has completed use of the backhoe, the same may be blocked up in the usual manner or re-transferred back to the rearward position as shown in FIGURE 5. Actuation of control 36 in FIGURE 3 will offer means to transfer the platform 28 and hence the backhoe structure back and forth along rails 25. The hoe structure can, again, be clamped to the upright boom structure 14, when desired and the boom structure pivoted in a counter-clockwise direction relative to FIGURE 1 in order for the tractor to be moved to a new work area.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Earth-moving equipment including, in combination, a tractor, boom means laterally extending from said tractor, and actuatable hoe means positioned upon said boom means and constructed for earth working at a region transversely spaced from said tractor, wherein said hoe means is oriented forwardly of said boom means and is constructed for downward and rearward engagement with earth therebeneath, said hoe means being pivotable about a vertical axis, and wherein said boom means is pivotally secured to said tractor for pivoting about a horizontal axis parallel to the longitudinal axis of said tractor, said boom means including an upstanding member, means for securing said hoe means to said upstanding member when said hoe means is pivotally displaced therefor, said structure including hoist means for elevating said boom means with said upstanding member, and said hoe means upwardly and over said tractor.

2. Earth-moving equipment including, in combination, a tractor having a hoe-mounting portion, boom means pivoted to said tractor and extending outwardly therefrom and transversely with respect thereto, a platform slidably secured to said boom means and constructed for in-and-out slidable movement, a hoe releasably secured to said platform, and fluid-actuated means for selectively translating said platform along said boom, and wherein said boom means includes an upstanding member, hoist means secured to and between said tractor and said upstanding member for drawing the latter upwardly and over said tractor, and foot means disposed proxiate the outermost extremity of said boom means and constructed and arranged for supporting the same above the earth being worked.

References Cited by the Examiner

UNITED STATES PATENTS

| | | | |
|---|---|---|---|
| 2,972,425 | 2/1961 | Anderson et al. | 214—138 |
| 3,019,923 | 2/1962 | Morrison et al. | 37—103 X |
| 3,072,272 | 1/1963 | Howlett | 214—141 |

FOREIGN PATENTS

| | | |
|---|---|---|
| 1,310,448 | 10/1962 | France. |
| 756,304 | 9/1956 | Great Britain. |

HUGO O. SCHULZ, *Primary Examiner.*